United States Patent
Kang et al.

(10) Patent No.: US 10,202,538 B2
(45) Date of Patent: *Feb. 12, 2019

(54) METHOD FOR INHIBITING STRUCTURE II GAS HYDRATE FORMATION

(71) Applicants: KOREA INSTITUTE OF ENERGY RESEARCH, Daejeon (KR); KOREA NATIONAL UNIVERSITY OF TRANSPORTATION INDUSTRY ACADEMIC COOPERATION FOUNDATION, Chungcheongbuk-do (KR)

(72) Inventors: Seong-Pil Kang, Daejeon (KR); Kisub Kim, Seoul (KR); Jong-Nam Kim, Daejeon (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/720,098

(22) Filed: May 22, 2015

(65) Prior Publication Data
US 2015/0337196 A1 Nov. 26, 2015

(30) Foreign Application Priority Data

May 23, 2014 (KR) ........................ 10-2014-0062337

(51) Int. Cl.
*C09K 8/52* (2006.01)
*C10L 3/10* (2006.01)

(52) U.S. Cl.
CPC ................ *C09K 8/52* (2013.01); *C10L 3/107* (2013.01); *C09K 2208/22* (2013.01)

(58) Field of Classification Search
CPC ........ C09K 2208/22; C09K 8/52; C09K 8/54; C09K 8/536; C09K 8/92; C09K 2208/24; C09K 8/524; C09K 8/516; C09K 8/528; C09K 8/706; C09K 2208/10; C09K 2208/20; C09K 2208/26; C09K 8/584; C09K 8/60; C09K 8/602; C09K 8/68; C09K 8/70; C09K 3/18; C09K 8/035; C09K 8/28; C09K 8/36; C09K 8/605; C09K 8/72; C09K 15/30; C09K 2208/12; C09K 2208/28; C09K 2208/30; C09K 2208/32; C09K 5/10; C09K 8/588; C09K 8/74; C09K 8/80; C09K 8/805; C09K 8/882; E21B 43/16; E21B 43/24; E21B 43/26; E21B 43/36; E21B 37/06; E21B 43/01; E21B 2043/0115; E21B 43/267
See application file for complete search history.

(56) References Cited

U.S. PATENT DOCUMENTS

| | | | | |
|---|---|---|---|---|
| 8,961,656 | B2* | 2/2015 | Kang | ................... C07D 207/06 548/405 |
| 9,228,075 | B2* | 1/2016 | Kang | ...................... C10L 3/107 |
| 2013/0112923 | A1* | 5/2013 | Kang | ...................... C10L 3/107 252/400.41 |

OTHER PUBLICATIONS

Villano L.D., Kelland M.A. An investigation into the kinetic hydrate inhibitor properties of two imidazolium-based ionic liquids on Structure II gas hydrate, Chemical Engineering Science, 2010, 65, 5366-5372.*
Seong-Pil Kang et al, Unusual synergy effect on methane hydrate inhibition when ionic liquid meets polymer, RSC Adv., 2013, 3, 19920-19923.*

* cited by examiner

*Primary Examiner* — Kumar R Bhushan
(74) *Attorney, Agent, or Firm* — Patterson + Sheridan, LLP

(57) ABSTRACT

The present invention provides a method for inhibiting structure II (sII) gas hydrate formation which comprises treating (i) a gas hydrate inhibitor and (ii) at least one additive selected from the group consisting of N-hexyl-N-methyl-pyrrolidinium tetrafluoroborate (HMP-BF$_4$), M-hydroxyethyl-N-methyl-pyrrolidinium tetrafluoroborate (HEMP-BF$_4$), N-ethyl-N-methyl-immidazolium tetrafluoroborate (EMIM-BF$_4$) and N-ethyl-N-methyl-pyrrolidinium tetrafluoroborate (EMP-BF$_4$) in water, which is in contact with a gas mixture of forming structure II gas hydrate.

The additives according to the present invention can exhibit the same or greater effects of inhibiting the formation of the structure II gas hydrate through an interaction, even when the amount of a gas hydrate inhibitor is reduced.

4 Claims, 1 Drawing Sheet

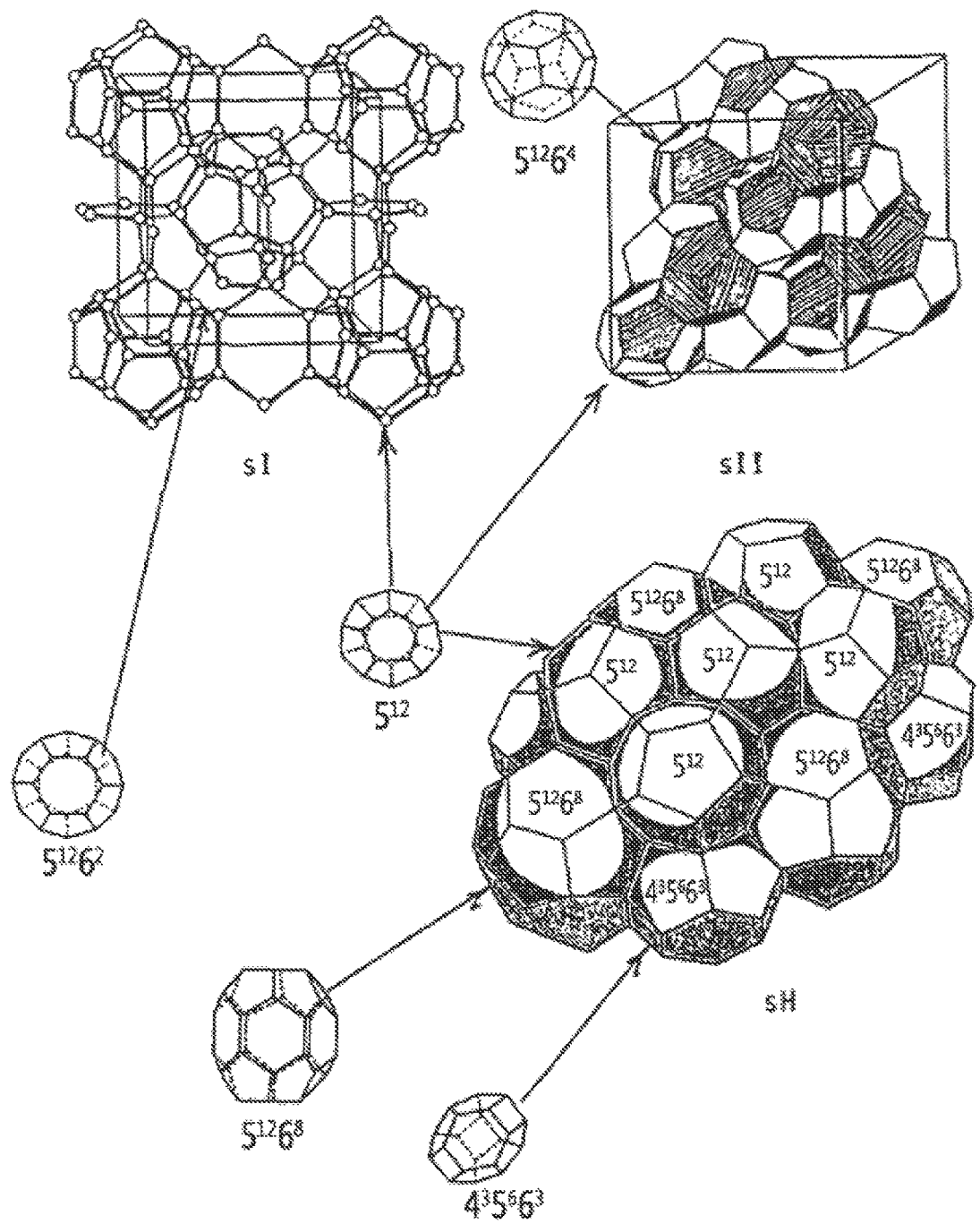

METHOD FOR INHIBITING STRUCTURE II GAS HYDRATE FORMATION

TECHNICAL FIELD

The present invention relates to a method for inhibiting structure II gas hydrate formation and a composition for inhibiting the gas hydrate formation.

BACKGROUND ART

A gas hydrate is a kind of inclusion compound and refers to a stable crystalline material produced by physically enclathrating gas molecules having a low molecular weight, such as methane, carbon dioxide and nitrogen within a cavity formed from water molecules, under conditions of high-pressure and low-temperature in general. An incorporated gas molecule, "guest", is entrapped within a solid lattice of the water molecule, i.e., "host", having hydrogen bonds under low-temperature and high-pressure conditions. Currently, 100 or more gas molecules are known to form a gas hydrate.

Since the above described gas hydrate is generally formed at low-temperature and high-pressure conditions, formation of gas hydrate under the atmosphere at room temperature and normal pressure is difficult to occur. However, in the deep sea with low-temperature and high-pressure, or at oil and gas production facilities on land at which a high pressure is maintained, an environment capable of forming the gas hydrate is created naturally, and as a result, gas hydrates occur in unwanted places and cause trouble.

In particular, in the case of the oil and gas industry, pipelines producing oil and gas from the reservoir in deep sea and transporting the up to surface are likely to be exposed to high-pressure condition or situated in a low temperature and high pressure environment in the sea. The low molecular gases included within the produced fluid being transported or the low molecular gas that flows in pipelines are reacted with water or the like to form gas hydrates in a solid state. The gas hydrate formed in the pipelines as described above blocks the fluid in the pipelines and interferes with the transportation of the produced fluid. Also, once the hydrate is formed, it is very costly and time-consuming to remove the hydrate plug. Pipeline operation is required to be stopped for the removal of the gas hydrate. For this reason, many efforts have been made to inhibit the formation of gas hydrates in the oil and gas industry.

Inhibitors have been developed to prevent the formation of such gas hydrates. However, conventional hydrate inhibitors cannot sufficiently inhibit the formation of the gas hydrate, or a very significant amount of the inhibitor is needed to sufficiently inhibit the formation of the gas hydrate. Accordingly, there is a need to develop a new inhibitor capable of effectively inhibiting the formation of gas hydrates and a composition capable of further increasing the effect thereof.

DISCLOSURE OF INVENTION

Technical Problem

In view of the above problems of the related prior art, an objective of the present invention is to develop additives which can, even when the amount of a gas hydrate inhibitor is reduced compared to that of conventional inhibitors, exhibit the same or greater effect of inhibiting the formation of structure II gas hydrates through the interaction, compared to the effect of a conventional gas hydrate inhibitor.

Technical Solution to the Problem

In a first aspect of the present invention there is provided a method for inhibiting structure II (sII) as hydrate formation, which includes treating (i) a gas hydrate inhibitor and (ii) at least one additive selected from the group consisting or N-hexyl-N-methyl-pyrrolidinium tetrafluoroborate (HMP-BF$_4$), N-hydroxyethyl-N-methyl-pyrrolidinium tetrafluoroborate (HEMP-BF$_4$) N-ethyl-N-methyl-immidazolium tetrafluoroborate (EMIM-BF$_4$) and N-ethyl-N-methyl-pyrrolidinium tetrafluoroborate (EMP-BF$_4$) in water, which is in contact with a gas mixture forming structure II (sII) gas hydrate.

In a second aspect of the present invention, there is provided a composition containing (i) a gas hydrate inhibitor and (ii) at least one additive selected from the group consisting of HMP-BF$_4$, EMIM-BF$_4$ and EMP-BF$_4$.

Hereinafter, the present invention will be described in detail.

The Deep sea is an environment which is prone to form gas hydrates due to its low temperature and high pressure. Therefore, when drilling reservoirs for petroleum or natural gas and the like in the sea, it is easy to form gas hydrates on the pipeline. Particularly, the formation of natural gas hydrates due to the coexistence of gas alongside petroleum, water or the like leads to problems.

The natural gas has different composition depending on the production site, but methane accounts for about 80-90% and the remainder may further contain gases such as ethane ($C_2H_6$), propane ($C_3H_8$), butane ($C_4H_{10}$) and the like. Incidentally, it may further contain hydrogen sulfide, nitrogen or carbon dioxide and the like. In many cases, natural gases are produced together with oil. Hence, the formation of natural gas hydrates during oil production in the deep sea possibly blocks the transport pipeline, thereby causing important flow assurance issues.

As shown in FIG. 1, the gas hydrate is classified into three different crystal structures, sI (body-centered cubic structure), sII (diamond lattice within a cubic framework) and sH (hexagonal framework). Structure I (sI) is formed from gas molecules smaller than propane. Therefore, most of structure I (sI) gas hydrates are found in a single gas molecule such as methane, ethane, carbon dioxide, and hydrogen sulfide. Structure II (sII) is formed from a gas containing molecules which are larger than ethane and smaller than pentane. Usually, the largest molecules of the gas mixture determines the structure of gas hydrates formed. When propane is added to methane in even a small amount, the hydrate structure is changed from sI to sII. On the other hand, the stability of a gas hydrate is much more sensitive to temperature rather than pressure.

The present inventors have developed additives which can exhibit the same or greater effects of inhibiting the formation of the structure II gas hydrate through the interaction, even when the amount of a gas hydrate inhibitor is reduced. As a result, the inventors have discovered that, unlike other similar additives shown in Table 3, HMP-BF$_4$, HEMP-BF$_4$, EMIM-BF$_4$ and/or EMP-BF$_4$ can exhibit the same or greater effects of inhibiting the formation of the structure II gas hydrate through the interaction even when the amount of a gas hydrate inhibitor is reduced, thereby effectively increasing the induction time of sII gas hydrate to be longer than that with vinyl caprolactam based polymeric inhibitor alone (for example, Poly Vinylcaprolactam alone), preferably to more than 16 hours, and even more preferably to 24 hours in the laboratory tests. That is, a combination of the gas hydrate inhibitor and the additives, exert the same or greater effects of inhibiting the formation of the structure II gas hydrate, compared to that of the gas hydrate inhibitor alone, even when the amount of the gas hydrate inhibitor is reduced. The present invention is based on this discovery.

When the additives of the invention are used together with a common low dose-type gas hydrate inhibitor, the time taken to form sII gas hydrate can be further delayed as compared to the case in which an equal amount of either additive or gas hydrate inhibitor is used alone.

As shown in Table 3, the time taken to form the hydrate was measured. As a result, the additives with a $BF_4$ anion (ionic liquid) were shown to exhibit a relatively good effect. The additives with a pyrrolidinium cation having methyl, ethyl, butyl, hydroxyethyl, pentyl, hexyl or octyl as a chain have been tested. However, the results failed to show any significant effect in a concerted manner.

The induction time of natural gas hydrate formation was measured and the results showed that combination of a few materials with Poly vinylcaprolactam (PVCap) yielded good results which did not result in hydrate formation for at least 16 hours. Particularly, a combination of HMP-$BF_4$ and PVCap yielded good results in which hydrate formation was significantly inhibited and so not occurred even with respect to $CH_4$ and natural gas. Several tests on the samples which did not result in a gas hydrate formation at 50 bar were carried out. As a result, it was found that the materials that significantly inhibited hydrate formation even at 77 bar were HEMP-$BF_4$ and HMP-$BF_4$.

In the present invention, the gas hydrate inhibitor refers to a compound which can prevent or retard the formation of gas hydrate.

Preferred examples of the gas hydrate inhibitors to be used in combination with the additives according to the present invention include a poly-N-vinyllactam based gas hydrate inhibitor. Non-limiting examples of the poly-N-vinyllactam based gas hydrate inhibitor include poly-N-vinylpyrrolidone(PVP), poly-N-vinyl-N-caprolactam (PV-Cap), N-vinylpyrrolidone: N-vinylcaprolactam copolymer (VP: VCap), N-methyl-N-vinyl acetatamide: N-vinylcaprolactam copolymer (VIMA: VCap), N-vinylcaprolactam: dimethylaminoethylmethacrylate copolymer (VCap: DMAEMA), N-vinylcarprolactam:hydroxyethylmetharcrylate copolymer (VCap: HEMA), N-vinylcaprolactam: N-vinylpyrroldione:vinyl formamide terpolymer or a mixture thereof.

One preferred example of the poly-N-vinyllactam based gas hydrate inhibitor includes a compound represented by Formula (1)

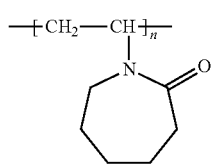

[Formula 1]

wherein n is an integer between 5 and 100 and preferably 10 and 60.

The number average molecular weight of the polyvinyl caprolactam represented by Formula (1) may be 2000 to 8000, preferably 4000 to 6000, and more preferably 5000.

Non-limiting other examples of the gas hydrate inhibitor to be used in combination with the additive according to the present invention may include methanol, ethanol, n-propanol, isopropanol, ethylene glycol, propylene glycol, potassium formate, methyl acrylamide, acrylamide, N-butylacrylamide, sodium chloride, polyvinyl pyrrolidone or a mixture thereof.

The gas mixture to form a gas hydrate of structure II (sII) used in the experiment of the present invention includes those containing methane, ethane, propane, iso-butane, n-butane, nitrogen and carbon dioxide (corresponding to the synthetic natural gas 1) and those containing methane, ethane, propane, iso-butane, n-butane, pentane, nitrogen and carbon dioxide (corresponding to the synthetic natural gas 2) (Preparation Example 3).

Accordingly, the present invention may be used to retard the formation of gas hydrate at a gas (for example, natural gas) further containing the molecules which are larger than ethane and smaller than pentane, in addition to methane.

The additives according to the present invention can be applied in a concentration of 0.01 to 30 wt %, preferably 0.05 to 11 wt %, and more preferably 0.1 to 1.5 wt % relative to water which is in contact with a gas mixture. If the concentration exceeds 30 wt %, the operation requires a prohibitively high cost. When applied to a pipeline or the like, it may lead to corrosion of the pipeline, generation of bubbles, and sticking to the pipe surface.

When using the additive according to the present invention, in order to exhibit the inhibitory effect against sII gas hydrate formation, the gas hydrate inhibitor may be used at a concentration of 0.1 to 1.5 wt % relative to water, which is in contact with a gas mixture.

Also, the present invention provides a composition containing (i) a gas hydrate inhibitor and (ii) at least one additive selected from the group consisting of N-hexyl-N-methyl-pyrrolidinium tetrafluoroborate (HMP-$BF_4$), N-ethyl-N-methyl-immidazolium tetrafluoroborate (EMIM-$BF_4$) and N-ethyl-N-methyl-pyrrolidinium tetrafluoroborate (EMP-$BF_4$).

Particularly, the composition containing (i) a compound represented by the formula (I) and (ii) N-hexyl-N-methyl-pyrrolidium tetrafluoroborate (HMP-$BF_4$) is preferred.

The above described additives may exhibit the same or greater effect of inhibiting sII gas hydrate formation even when the amount of the gas hydrate inhibitor is reduced.

Accordingly, the compositions according to the present invention can prevent or delay the formation of gas hydrate by adding to the position for preventing or retarding the formation of sII gas hydrate.

Advantageous Effects

The use of additives according to the present invention, i.e., N-hexyl-N-methyl-pyrrolidinium tetrafluoroborate (HMP-$BF_4$), N-hydroxyethyl-N-methyl-pyrrolidinium tetrafluoroborate (HEMP-$BF_4$), N-ethyl-N-methyl-immidazolium tetrafluoroborate (EMIM-$BF_4$) and/or N-ethyl-N-methyl-pyrrolidinium tetrafluoroborate (EMP-$BF_4$), can exhibit the same or greater effects of inhibiting the formation of the structure II gas hydrate through an interaction, as compared with that of the gas hydrate inhibitor alone, even when the amount of a gas hydrate inhibitor is reduced, thereby effectively retarding the formation of sII gas hydrate.

DESCRIPTION OF DRAWINGS

FIG. 1 is a diagram illustrating a unit crystal of three gas hydrates (sI, sII, sH), and a cavity thereof.

BEST MODE

Hereinafter, the preferred examples are given to help the understanding of the present invention. However, these examples are only intended to more easily illustrate the present invention and should not be construed as limiting the scope of the present invention.

PREPARATION EXAMPLE 1

Preparation of N-hexyl-N-methyl-pyrrolidinium tetrafluoroborate, [HexMP] [$BF_4$])

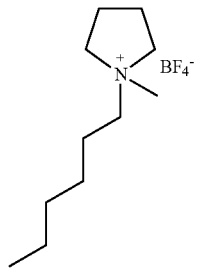

1-methylpyrrolidine (0.5 mol) was added to 200 mL of acetonitrile in a three-neck flask, and 0.5 mol of 1-chlorohexane was put in the three-neck flask. The mixture was heated while stirring at a temperature of 343.15 K under nitrogen atmosphere for 72 hours. After the reaction, to separate the resulting salt (N-hexyl-N-methyl-pyrrolidinium chloride, [HexMP] [Cl]), and unreacted impurities and acetonitriles, the salt was fractionated using a separatory funnel. The separated salt was then washed about three times with acetone. The washed [HexMP] [Cl] was dried at a temperature of 333.15 K and a pressure of 0.3-2 bar for 2 hours using a rotary evaporator and then the [HexMP] [Cl] was dried in a vacuum oven at 343.15 K for 48 hours.

More specifically, in order to substitute an anion of [HexMP][Cl] to synthesize [HexMP] [$BF_4$], acetone and 0.2 mole of sodium tetrafluoroborate and [HexMP] [Cl] were put in a round-bottom flask, and allowed to react while stirring for 48 hours.

After stirring for 48 hours, NaCl impurity was filtered using a filter paper. In order to increase the purity of the compounds, the filtrate was washed with dichloromethane. The salt produced by this anion-substitution reaction, N-hexyl-N-methyl-pyrrolidinium tetrafluoroborate ([HexMP] [$BF_4$], was dried using a rotary evaporator at 333.15 K to remove volatile materials. The resulting ionic liquid, [HexMP] [$BF_4$], was dried and dehydrated in a vacuum oven at a temperature of 343.15 K for 24 hours to give the final compound.

H-NMR ($D_2O$) spectrum peaks: 0.85-0.75 (t, 3H), 1.2-1.3 (m, 6H), 1.70-1.74 (m, 1H), 2.13 (s, 4H), 2.96 (s, 3H), 3.22-3.25 (m, 2H), 3.41-3.43 (m, 4H)

PREPARATION EXAMPLE 2

Preparation of polyvinyl caprolactam

Polyvinylcaprolactam having a number average molecular weight of 5000 was obtained by evaporating ethanol from Luviskol Plus (manufactured by BASF Corp.).

PREPARATION EXAMPLE 3

Preparation of synthetic natural gas 1 and synthetic natural gas 2

The synthetic natural gas 1 and the synthetic natural gas 2 were prepared with the composition ratio as shown in Table 1.

TABLE 1

| Synthetic natural gas 1 | | Synthetic natural gas 2 | |
|---|---|---|---|
| component | vol. % | component | vol. % |
| $CH_4$ | 90.07 | $CH_4$ | 89.90 |
| $C_2H_6$ | 4.18 | $C_2H_6$ | 4.29 |
| $C_3H_8$ | 2.11 | $C_3H_8$ | 2.29 |
| iso-$C_4H_{10}$ | 0.82 | iso-$C_4H_{10}$ | 0.27 |
| n-$C_4H_{10}$ | 0.65 | n-$C_4H_{10}$ | 0.59 |
| iso-$C_5H_{12}$ | | iso-$C_5H_{12}$ | 0.27 |
| n-$C_5H_{12}$ | | n-$C_5H_{12}$ | 0.19 |
| $CO_2$ | 1.94 | $CO_2$ | 1.97 |
| $N_2$ | 0.23 | $N_2$ | 0.23 |

[Apparatus] Experimental apparatus for measuring the induction time of gas hydrate formation.

A high pressure reactor having an internal volume of about 350 cc and made of 316 stainless steel was prepared. The high pressure reactor was disposed in a water tank installed with an external cooling circulator for temperature control. A sapphire observation window was provided over the high pressure reactor in order to observe and confirm visually whether or not a hydrate was formed inside. A pressure transducer and a thermocouple were provided in order to measure the temperature and pressure inside the high pressure reactor.

This experimental system including a high-pressure reactor and measuring procedure of the phase equilibrium temperature and pressure during the hydrate formation and dissociation thereof is disclosed in the paper "Experimental measurement of the induction time of natural gas hydrate and its prediction with polymeric kinetic inhibitor (Chemical Engineering Science 116 (2014), 817-823)".

EXAMPLE 1

N-hexyl-N-methyl-pyrrolidinum tetrafluoroborate of Preparation Example 1, and polyvinylcaprolactam of Preparation Example 2 were dissolved in distilled water to obtain a composition (Example 1) containing 0.5 wt % of N-hexyl-N-methyl-pyrrolidinum tetrafluoroborate and 1 wt % of polyvinylcarprolactam.

EXPERIMENTAL EXAMPLE 1

Measuring an Induction Time in the Formation of Natural Gas Hydrate 90 g of the composition of Example 1 was put into a high pressure reactor, and the high pressure reactor was tightly closed. After removing the air remaining in the high pressure reactor, synthetic natural gas 1 prepared by Preparation Example 3 was injected into the high pressure reactor until the pressure in the high pressure reactor reached 77 bar.

Subsequently, the high pressure reactor was put into a temperature-controllable water bath, and the pressure and temperature in the high pressure reactor were measured in real time using a pressure transducer and a thermocouple connected to the data acquisition system.

After setting the temperature in the high pressure reactor at about 5.5° C., the solution was mixed continuously using a mechanical stirrer at a rotation speed of about 600 rpm so that the composition of Example 1 was uniformly mixed while constantly maintaining the temperature of the solution.

When natural gas hydrate is formed, the temperature in the high pressure reactor is rapidly increased, and the pressure in the high pressure reaction is rapidly decreased. Therefore, the changes in the pressure and temperature in the high pressure reactor were continuously measured. Upon observation of a rapid temperature increase and a pressure drop, the time from the beginning of stirring up to the point was measured and the time from the start of stirring up to the point was defined as the induction time of a hydrate formation.

At this time, the induction time of Example 1 (77 bar, 5.5° C.) was more than 1,440 minutes.

COMPARATIVE EXAMPLES 1 and 2

In Comparative Example 1, only distilled water was used instead of the composition of Example 1.

On the other hand, the polyvinylcaprolactam of Preparation Example 2 was dissolved, in distilled water to obtain a composition (Comparative Example 2) containing 1.5 wt % of polyvinylcarprolactam.

EXPERIMENTAL EXAMPLE 2

Measuring the Induction Time of Natural Gas Hydrate 90 g of the compositions of Example 1, Comparative Example 1 and Comparative Example 2, were respectively put into the high pressure reactor and the high pressure reactor was tightly closed. After removing the air remaining in the high pressure reactor, the synthetic natural gas 1 prepared by Preparation Example 3 was injected into the high pressure reactor to control the pressure in the high-pressure reactor at 93 bar.

Subsequently, the high pressure reactor was nut into a temperature-controllable water bath, and the pressure and temperature in the high pressure reactor was measured in real time using a pressure transducer and a thermocouple connected to the data acquisition system.

After setting the temperature in the high pressure reactor at 6° C., the solution was mixed continuously using a mechanical stirrer at a speed of 600 rpm so that the compositions of Example 1, Comparative Example and Comparative Example 2 were uniformly mixed while constantly maintaining the temperature of the solution.

The induction times of the compositions of Example 1, Comparative Example 1 and Comparative Example 2 are shown in Table 2 below.

TABLE 2

| Induction Time | Example 1 | Comparative Example 1 | Comparative Example 2 |
|---|---|---|---|
| 93 bar 6° C. | N-hexyl-N-methyl-pyrrolidinium tetrafluoroborate 0.5 wt % + Polyvinylcaprolactam 1 wt % | Distilled water | Polyvinylcaprol actam 1.5 wt % |
| Minutes | 1350 minutes | 5.5 minutes | 564 minutes |

As shown in Table 2 above, when N-hexyl-N-methyl-pyrrolidinium tetrafluoroborate was mixed with polyvinyl-caprolactam, the induction time of the natural gas hydrate formation was further increased and the hydrate was not formed for up to about 24 hours.

EXPERIMENTAL EXAMPLE 3

Measuring an Induction Time of Hydrate Formation

The induction time was measured in the same manner as in Experimental Example 1 except that the additives, methane gas, synthetic natural gas 2, and reactor pressure and temperature shown in Table 3 below were used.

TABLE 3

| | CH$_4$ | | | | | Synthetic natural gas 2 | | | | | | | | |
|---|---|---|---|---|---|---|---|---|---|---|---|---|---|---|
| | 70 bar, 1° C. (dT = 9K) induction time (min) | | | | | 50 bar, 4° C. (dT = 10K) induction time (min) | | | | | 77 bar, 5.5° C. (dT = 10K) induction time (min) | | | |
| | single | | | | mixture | single | | | | mixture | single | | | mixture |
| Additive Material | 0 wt % | 0.5 wt % | 1.0 wt % | 3 wt % | 0.5 + 0.5 wt % | 0 wt % | 0.5 wt % | 1.0 wt % | 3.0 wt % | 0.5 + 0.5 wt % | 0 wt % | 0.5 wt % | 1.0 wt % | 0.5 + 0.5 wt % |
| water | 2.6 | | | | | 14.2 | | | | | 1.7 | | | |
| PVCap | | 22.8 | 26.2 | 53.5 | | | 435.2 | 1392.4 | NH | | | 27.5 | 256.3 | |
| EMIM-BF$_4$ | | 62.1 | 79.4 | 95.5 | 120.3 | | 39.1 | 60.8 | 88.7 | NH | | | | 236.2 |
| EMP-BF$_4$ | | 56.3 | 52.0 | 44.1 | 104.3 | | 18.7 | 45.8 | 64.8 | NH | | | | 90.5 |
| EMP-Br | | 5.0 | 7.0 | 4.5 | 9.3 | | 19.8 | 45.6 | 72.8 | 142.4 | | | | |
| EMP-Cl | | 42.1 | 63.9 | 70.0 | 26.1 | | 10.3 | 53.6 | 51.9 | 55.3 | | | | |
| BMP-BF$_4$ | | 40.4 | 47.2 | 77.0 | 65.8 | | 21.3 | 49.1 | 52.4 | 62.5 | | | | 89.6 |
| BMP-Br | | 3.6 | 12.3 | 15.2 | 14.8 | | | | | | | | | |
| BMP-Cl | | 20.4 | 21.9 | 27.9 | 18.1 | | | | | | | | | |
| HEMP-BF$_4$ | | 78.8 | 91.2 | 139.4 | 184.9 | | 23.8 | 30.9 | 49.2 | NH | | | | NH |
| HEMP-Cl | | 17.5 | 24.4 | 51.6 | 75.1 | | 10.4 | 18.3 | 32.8 | 45.2 | | | | |
| PMP-BF$_4$ | | 23.2 | 35.6 | | 59.6 | | 45.2 | 65.8 | 78.4 | 95.4 | | | | 85.3 |

TABLE 3-continued

| | | | | | | | | |
|---|---|---|---|---|---|---|---|---|
| HMP-BF$_4$ | 17.8 | 30.8 | NH | 95.4 | 132.6 | 149.3 | NH | NH |
| OMP-BF$_4$ | 6.7 | 10.3 | 34.9 | 52.1 | 64.2 | 70.4 | 130.2 | 44.4 |
| HMP-Cl | 5.4 | 20.4 | 55.34 | 48.2 | 70.2 | 85.3 | NH | 38.6 |

* NH = no hydrate (for more than 16 hours)
EMIM-BF$_4$   N-ethyl-N-methyl-immidazolium tetrafluoroborate
EMP-BF$_4$   N-ethyl-N-methyl-pyrrolidinium tetrafluoroborate
EMP-Br   N-ethyl-N-methyl-pyrrolidinium tetrafluorobromide
EMP-Cl   N-ethyl-N-methyl-pyrrolidinium tetrafluorochloride
BMP-BF$_4$   N-butyl-N-methyl-pyrrolidinium tetrafluoroborate
BMP-Br   N-butyl-N-methyl-pyrrolidinium tetrafluorobromide
BMP-Cl   N-butyl-N-methyl-pyrrolidinium tetrafluorochloride
HEMP-BF$_4$   N-hydroxyethyl-N-methyl-pyrrolidinium tetrafluoroborate
HEMP-Cl   N-hydroxyethyl-N-methyl-pyrrolidinium tetrafluorochloride
PMP-BF$_4$   N-pentyl-N-methyl-pyrrolidinium tetrafluoroborate
HMP-BF$_4$   N-hexyl-N-methyl-pyrrolidinium tetrafluoroborate
OMP-BF$_4$   N-octyl-N-methyl-pyrrolidinium tetrafluoroborate
HMP-Cl   N-hexyl-N-methyl-pyrrolidinium chloride The experiments on the natural gas hydrate (NGH, structure II) and CH$_4$ hydrate were carried out using various pyrrolidinium and immidazolium based ionic liquid as an additive of PVCap to measure the induction time of the hydrate formation.

The induction time of natural gas hydrate formation was measured. As a result, a combination of PVCap with several materials showed a good result in that hydrate formation did not occur for up to about 16 hours.

Particularly, a combination of HMP-BF$_4$ and PVCap yielded a result wherein hydrate formation is significantly inhibited and so did not occur even with respect to CH$_4$ and natural gas.

Usually, even at the same subcooling, as the pressure increases (the density of gas increase), the possibility for more gas molecules to contact water molecules also increases, thus promoting the hydrate formation. The tests on several samples which did not result in hydrate formation at 50 bar were carried out. As a result, the materials that significantly inhibited hydrate formation even at 77 bar were HEMP-BF$_4$ and HMP-BF$_4$.

What is claimed is:

1. A method for inhibiting structure II (sII) gas hydrate formation, comprising treating (i) a gas hydrate inhibitor and (ii) at least one additive selected from the group consisting of N-hexyl-N-methyl-pyrrolidinium tetrafluoroborate (HMP-BF$_4$) and N-ethyl-N-methyl-pyrrolidinium tetrafluoroborate (EMP-BF$_4$) in water, which is in contact with a gas mixture forming structure II gas hydrate, further containing molecules larger than ethane and smaller than pentane, in addition to methane, wherein the structure II gas hydrate formation is inhibited for at least 16 hours at a pressure of from about 50 bar to about 93 bar and a temperature of from about 1° C. to about 6° C., and the at least one additive is treated at a concentration of 0.1 wt % to 1.5 wt % relative to water, which is in contact with the gas mixture, and the gas hydrate inhibitor is applied at a concentration of 0.1 wt % to 1.5 wt % relative to water, which is in contact with the gas mixture, wherein the gas hydrate inhibitor is a compound represented by Formula (1):

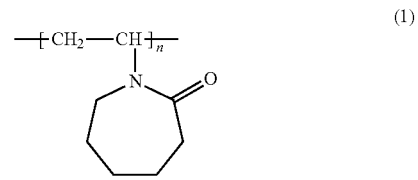

wherein n is an integer of 5 to 100.

2. The method for inhibiting structure II gas hydrate formation according to claim 1, wherein the gas mixture forming the sII gas hydrate contains methane, propane, iso-butane, n-butane, nitrogen and carbon dioxide.

3. The method for inhibiting structure II gas hydrate formation according to claim 1, wherein the gas mixture forming the sII gas hydrate contains methane, propane, iso-butane, n-butane, nitrogen and carbon dioxide.

4. The method for inhibiting structure II gas hydrate formation according to claim 1, wherein the gas mixture forming the sII gas hydrate is a natural gas.

* * * * *